US008411563B2

(12) United States Patent
Park et al.

(10) Patent No.: US 8,411,563 B2
(45) Date of Patent: Apr. 2, 2013

(54) APPARATUS AND METHOD FOR MULTICAST AND BROADCAST SERVICE IN BROADBAND WIRELESS ACCESS SYSTEM

(75) Inventors: Eun-Chan Park, Seongnam-si (KR); Ki-Back Kim, Seongnam-si (KR); Ju-Yong Lee, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1302 days.

(21) Appl. No.: 12/034,689

(22) Filed: Feb. 21, 2008

(65) Prior Publication Data

US 2008/0198797 A1 Aug. 21, 2008

(30) Foreign Application Priority Data

Feb. 21, 2007 (KR) .......................... 10-2007-0017329

(51) Int. Cl.
 *H04L 1/00* (2006.01)
(52) U.S. Cl. ........................................ 370/230; 370/310
(58) Field of Classification Search .................. 370/312, 370/328

See application file for complete search history.

(56) References Cited

U.S. PATENT DOCUMENTS 7,788,393 B2 * 8/2010 Pickens et al. ................ 709/231
2002/0196808 A1 * 12/2002 Karri et al. .................... 370/468
2006/0056559 A1 * 3/2006 Pleasant et al. ............... 375/356

FOREIGN PATENT DOCUMENTS

| KR | 1999-0051060 | 7/1999 |
| KR | 1020000014429 | 3/2000 |
| KR | 1020040056979 | 7/2004 |
| KR | 1020080038805 | 5/2008 |

* cited by examiner

*Primary Examiner* — Kevin C Harper
*Assistant Examiner* — Henry Baron
(74) *Attorney, Agent, or Firm* — The Farrell Law Firm, P.C.

(57) ABSTRACT

Disclosed is an apparatus and method for an MBS service in a BWA system. An apparatus of a base station includes a time controller, a CAC processor, and a buffer controller. The time controller manages a broadcast start time and a broadcast end time and generates a broadcast start message at a predetermined time before the actual broadcast start time. Upon receipt of the generated broadcast start message from the time controller, the CAC processor calculates a capacity decrease due to broadcast service and subtracts the capacity decrease from the current available capacity to update the available capacity. Upon receipt of the generated broadcast start message from the time controller, the buffer controller controls the buffer occupation of unicast traffic in order to provide the buffer space required for a broadcast service.

33 Claims, 4 Drawing Sheets

APPARATUS AND METHOD FOR MULTICAST AND BROADCAST SERVICE IN BROADBAND WIRELESS ACCESS SYSTEM

PRIORITY

This application claims priority under 35 U.S.C. §119 to an application filed in the Korean Intellectual Property Office on Feb. 21, 2007 and assigned Serial No. 2007-17329, the contents of which are incorporated herein by reference.

BACKGROUND OF THE INVENTION

1. Field of the Invention

The present invention relates generally to an apparatus and method for a Multicast and Broadcast Service (MBS) in a Broadband Wireless Access (BWA) system, and in particular, to an apparatus and method for simultaneously providing an MBS service and a unicast service in a BWA system.

2. Description of the Related Art

As generally known in the art, communication systems have been primarily developed for voice communication services, but they are also evolving to provide data services and various multimedia services. However, conventional communication systems, which are mainly directed to providing voice communication services, have a narrow data transmission bandwidth and require a high subscription fee. For these reasons, they cannot satisfy diversified user demands. Furthermore, in line with rapid development in the communication industry and ever-increasing demands on Internet services, it is important to provide communication systems capable of providing Internet services efficiently. As a result of these trends, BWA systems having a bandwidth large enough to both satisfy the increasing user demands and provide efficient Internet services have been proposed.

In addition to providing voice communication services, BWA systems aim at supporting a variety of low-speed as well as high-speed data services and multimedia application services (e.g., high-quality moving pictures) in combination. Based on wireless media using a broadband of 2 GHz, 5 GHz, 26 GHz, or 60 GHz, BWA systems are able to access the Public Switched Telephone Network (PSTN), the Public Switched Data Network (PSDN), the Internet, the International Mobile Telecommunications-2000 (IMT-2000) network, and the Asynchronous Transfer Mode (ATM) network in a mobile or stationary environment. In other words, BWA systems can support a channel transmission rate of at least 2 Mbps. BWA systems may be classified into broadband wireless local loops, broadband mobile access networks, and high-speed wireless Local Area Networks (LANs) according to the terminal's mobility (stationary or mobile), communication environment (indoor or outdoor), and channel transmission rate.

Examples of principal services of the BWA systems are Internet services, Voice over IP (VoIP) services, and non-real-time streaming services. Recently, a Multicast and Broadcast Service (MBS) has emerged as a new real-time broadcast service. The MBS service can provide two-way data communication while supporting mobility unlike a Digital Multimedia Broadcasting (DMB) service where only one-way communication is provided.

The MBS can provide video broadcast services, such as news, dramas and sports game, and data services such as radio music broadcast and real-time traffic information. Compared to the conventional unicast service, the MBS service has the following characteristics.

(1) Formality: The unicast service generates connections and transmits/receives traffic according to the request/need of the users, whereas the MBS service always transmits traffic for a predetermined time (e.g., from 6 a.m. to 10 p.m.) regardless of reception by the users.

(2) Transmission rate: The MBS traffic is used mainly for multimedia services, and has a fixed transmission rate, packet size, and inter-packet interval.

(3) Resource allocation: The MBS traffic is serviced for a predetermined broadcast time using pre-allocated resources. That is, dedicated resources are reserved for MBS service during a predetermined broadcast time, which reduces resources for the unicast service.

As described above, because the MBS service causes a change in the available resources for the unicast service, a Quality of Service (QoS) framework must consider the following things due to the MBS service.

(1) Before the start of the broadcast: If the unicast service occupies all available resources, MBS resources must be provided before the start of the broadcast for a smooth broadcast service.

(2) During the broadcast: Resources for the unicast service are reduced during the MBS service.

(3) After the end of the broadcast: Resources allocated for the MBS service must be released.

If the MBS resources fail to be provided before the start of the broadcast, the quality of the broadcast service may be degraded and low-priority unicast service may be disconnected. Also, resources are wasted if the MBS resources are not released after the end of the broadcast.

SUMMARY OF THE INVENTION

An object of the present invention is to substantially solve at least the above-mentioned problems and/or disadvantages and to provide at least the advantages below. Accordingly, an object of the present invention is to provide an apparatus and method for simultaneously providing an MBS service and a unicast service in a BWA system.

Another object of the present invention is to provide an apparatus and method for guaranteeing a QoS when an MBS service and a unicast service are simultaneously provided in a BWA system.

Still another object of the present invention is to provide an apparatus and method for performing a Connection Admission Control (CAC) in a BWA system in consideration of an MBS service.

Even another object of the present invention is to provide an apparatus and method for managing a buffer in a BWA system in consideration of an MBS service.

According to one aspect of the present invention, an apparatus of a base station in a wireless communication system includes: a time controller for managing a broadcast start time and a broadcast end time and generating a broadcast start message at a predetermined time before the broadcast start time; and a Connection Admission Control (CAC) processor for, upon receipt of the generated broadcast start message from the time controller, calculating a capacity decrease due to broadcast service and subtracting the capacity decrease from the current available capacity to update the available capacity.

According to another aspect of the present invention, an apparatus of a base station in a wireless communication system includes a time controller for managing a broadcast start time and a broadcast end time and generating a broadcast start message at a predetermined time before the broadcast start time; and a buffer controller for, upon receipt of the generated broadcast start message from the time controller, controlling the buffer occupation of unicast traffic in order to provide the buffer space for a broadcast service.

According to still another aspect of the present invention, a method for operating a base station in a wireless communication system includes checking whether the current time is a predetermined time before a broadcast start time; calculating a capacity decrease due to broadcast service at the predetermined time before the broadcast start time; and updating an available capacity used for Connection Admission Control (CAC) using the calculated capacity decrease.

According to even another aspect of the present invention, a method for operating a base station in a broadband wireless access communication system includes checking whether the current time is a predetermined time before a broadcast start time; and if the current time is the predetermined time before the broadcast start time, controlling the buffer occupation of unicast traffic in order to provide the buffer space for a broadcast service.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Figure 1:
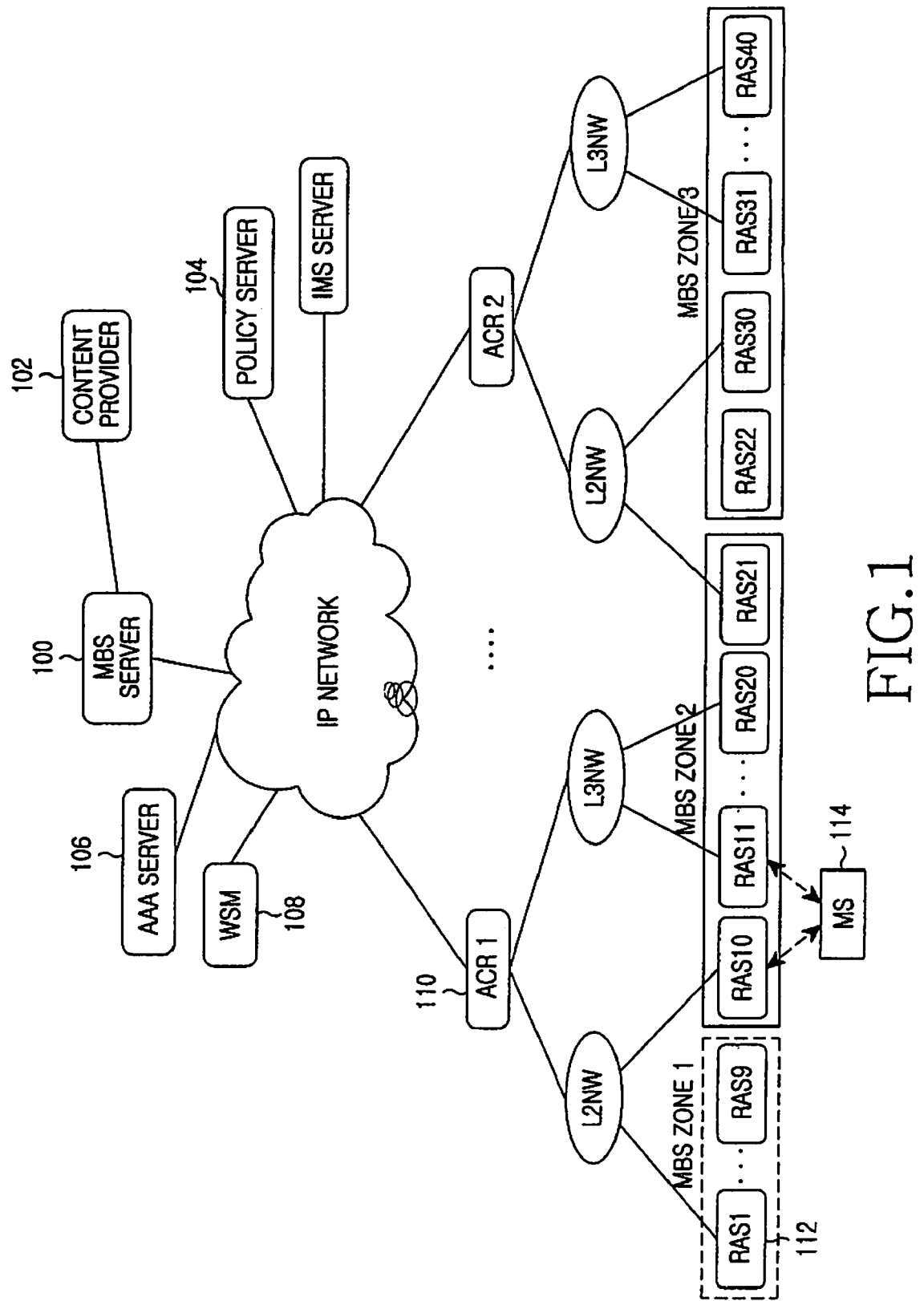
FIG. 1 illustrates a network structure for providing an MBS service according to an embodiment of the present invention.

Preferred embodiments of the present invention will be described herein below with reference to the accompanying drawings. In the following description, well-known functions or constructions are not described in detail since they would obscure the invention in unnecessary detail. Also, the terms used herein are defined according to the functions of the present invention. Thus, the terms may vary depending on user's or operator's intention and usage. Therefore, the terms used herein must be understood based on the descriptions made herein.

The present invention provides a scheme for simultaneously providing a broadcast service and a unicast service in a wireless communication system. The following description is made in the context of an Orthogonal Frequency Division Multiple Access-Time Division Duplex (OFDMA-TDD) communication system, to which the present invention is not limited. Thus, it is to be clearly understood that the present invention is applicable to any other communication system that simultaneously provides a unicast service and a broadcast service using other access scheme or other duplexing scheme.

In the following description, a broadcast service may be referred to as a Multicast and Broadcast Service (MBS), a MultiCast BroadCast Service (MCBCS), a Multimedia Broadcast and Multicast Service (MBMS), or a BroadCast/MultiCast Service (BCMCS) depending on the intentions of operators and standardization groups. Also, the name of a Network Entity (NE) is defined according to its function and may vary depending on the intentions of the operators or the standardization groups. For example, a base station may also be referred to as an Access Point (AP), a Radio Access Station (RAS), a Node-B, or Base Station (BS). In addition, a base station controller may also be referred to as a Radio Network Controller (RNC), an Access Control Router (ACR), Base Station Controller (BSC), or an Access Service Network-GateWay (ASN-GW). Herein, the ASN-GW may function as a base station controller as well as a router.

In a QoS framework considering an MBS service, available resources must be considered in terms of both capacity and buffer. A Connection Admission Control (CAC) scheme is described in terms of capacity and then a buffer control scheme is described. The following conditions are assumed in the present invention.

(1) An MBS service is provided only for a predetermined time by a service provider;

(2) The MBS service is provided with a predetermined level of Modulation and Coding Scheme (MCS); and (3) The MBS service does not perform permutation switching.

CAC Scheme Considering MBS Service

A CAC processor must detect an MBS-induced change in system capacity. That is, before the start of an MBS broadcast, the CAC processor must update available capacity in consideration of the MBS service. Also, after the end of the MBS broadcast, the CAS processor must update the available capacity in consideration of the end of the MBS service. For example, an MBS-induced capacity decrease $\Delta C_{MBS}$ can be calculated by Equation (1):

$$\Delta C_{MBS} = C_{avg} \times \left(\frac{N_{MBS}}{N_{DN}}\right) \times \alpha_C \qquad (1)$$

where $C_{avg}$ denotes the average radio channel capacity (transmission rate) not considering the MBS service, $N_{MBS}$ denotes radio resources (e.g., the number of slots or the number of symbols) allocated for the MBS service, $N_{DN}$ denotes the total downlink radio resources (except resources allocated for preambles and control channels), and $\alpha_C (>1)$ denotes a scaling factor for allowing a predetermined margin.

The duration of a QoS connection is finite in the case of, for example, a VoIP service. If the average connection duration is $T_{dur}$, an MBS-induced capacity decrease is beforehand reflected in the CAC scheme $(T_{dur}+\delta_C)$ time before the broadcast start time. For example, when the average connection duration is three minutes, an MBS-induced capacity decrease is beforehand reflected in the CAC scheme six minutes before the broadcast start time. In this case, a connection started four minutes before the broadcast start time does not cause QoS degradation because it ends before the broadcast start time.

Herein, the most important thing is to set a suitable $\delta_C$ value. There is a trade-off between the QoS and the efficiency in setting the value of $\delta_C$. That is, as the value of $\delta_C$ increases, the probability of QoS degradation decreases and the efficiency also decreases because the available capacity is reduced unnecessarily earlier than the actual broadcast start time. The present invention provides a method for setting the $\delta_C$ value on the basis of the probability of the OoS degradation. Assuming that the value of the connection duration of a unicast service follows a normal distribution having a mean of $T_{dur}$ and a standard deviation of $\sigma_{dur}$, the $\delta_C$ value can be determined by Equation (2):

$$\delta_C = K \times \sigma_{dur} \qquad (2)$$

That is, the MBS-induced capacity decrease is reflected in the CAC scheme ($T_{dur}+K\times\sigma_{dur}$) time before the broadcast start time. When K=2.3, the probability that the connection ends before the broadcast start time is 99% and the probability that the connection continues even after the broadcast start time is 1%. Table 1 below shows the relationship between the K value and the value of the probability of QoS degradation.

TABLE 1

|  | Target value of QoS degradation | | |
|---|---|---|---|
|  | 0.1% | 1% | 5% |
| K value | 3.09 | 2.33 | 1.64 |

Buffer Control Scheme Considering MBS Service

Separate buffers are provided respectively for broadcast channels. Herein, buffer sizes may be determined in consideration of transmission delays or packet sizes corresponding to the respective broadcast channels. For example, assuming that an MBS packet is transmitted in every 5-ms TDD frame, a payload size of a pure application layer is 240 bytes in the case of an H.264-encoded 384-Kbps video channel. A packet size is determined in consideration of a 40-byte Real-time Transport Protocol/User Datagram Protocol/Internet Protocol (RTP/UDP/IP) overhead of a real-time transmission packet and an overhead of other Media Access Control (MAC) layer. Herein, it is assumed that the packet size is 300 bytes. A packet buffering time is determined in consideration of synchronization and the maximum transmission delay from the generation to the transmission of MBS traffic. Herein, it is assumed that the packet buffering time is 200 ms. Then $$40 \left( = \frac{200 \text{ ms}}{5 \text{ ms}} \right)$$

MBS packets can be buffered in a buffer. Thus, a buffer size necessary for one 384-Kbps video channel is about 12 Kbytes (=300 bytes×40).

Although it is preferred that an additional dedicated buffer is provided for MBS traffic, an additional dedicated buffer space cannot be provided because MBS traffic is not considered at the system design stage. That is, unicast traffic and MBS traffic have no choice but to share the same buffer. In this case, for the broadcast QoS, it is necessary to allocate a buffer preferentially to the MBS traffic.

A buffer size for the entire MBS traffic is calculated using the total number of the broadcast channels and the buffer sizes for the respective broadcast channels. The calculated buffer size is defined as $B_{MBS}$. A buffer space with a size of $B_{MBS}$ must always be provided for MBS traffic during the broadcast service. However, if the buffer is filled with unicast traffic at the broadcast start time, a buffer space for MBS traffic cannot be immediately provided. In this case, the unicast traffic loaded in the buffer must be forcibly dropped (discarded) or it is necessary to wait until the loaded unicast traffic is served from the buffer. In order to prevent the situation of the buffer space not being immediately provided, the present invention provides the buffer space for the MBS traffic $\delta_B$ time before the broadcast start time. For example, if the broadcast starts at 9 o'clock, the provisioning of the buffer space for the MBS traffic may start from 8:59. That is, if the buffer is filled before the broadcast start time, the occupation of the buffer space by the unicast traffic is restricted from 1 minute before the broadcast start time and the unicast traffic is served from the buffer during the 1 minute, so that the buffer space for the MBS traffic can be provided in advance. Herein, the time $\delta_B$ can be determined by Equation (3):

$$\delta_B = \frac{B_{MBS}}{C_{avg}} \times \alpha_B \qquad (3)$$

where $B_{MBS}$ denotes the buffer size required by the MBS traffic, $C_{avg}$ denotes the traffic output rate from the buffer (i.e., the transmission rate), and $\alpha_B(>1)$ denotes a scaling factor for allowing a predetermined margin.

Herein, the occupation of the buffer space by the unicast traffic may be restricted in the priority order of a Best Effort (BE) service→a Non-Real-Time (NRT) service→a Real-Time (RT) service. That is, in terms of buffer allocation, the priority order of traffic is MBS>Unsolicited Grant Service (UGS)>NRT service>BE service. The above buffer control operation is stopped upon terminal of the broadcast service.

Based on the above-described concepts, specific embodiments of the present invention will be described below in detail with reference to the accompanying drawings.

FIG. 1 illustrates a network structure for providing an MBS service according to an embodiment of the present invention.

Referring to FIG. 1, the network includes an MBS server 100, a content provider 102, a policy server 104, an Authentication/Authorization/Accounting (AAA) server 106, a system manager 108 (e.g., a WiBro System Manager (WSM)) 108, a Access Control Router (ACR) 110, a Radio Access Station (RAS) 112, and a Mobile Station (MS) 114. Hereinafter, the ACR 110 and the RAS 112 are collectively referred to as an Access Service Network (ASN).

The MBS server 100 is a content server. The MBS server 100 generates/stores contents, and transmits the corresponding MBS traffic to the ASN in response to the request of the MS 114. Also, the MBS server 100 interfaces with the content provider 102 and the AAA server 106 and informs the AAA server 106 of a service request received from the MS 114. Also, the MBS server 100 manages the broadcast schedules of service providers, and performs functions such as subscription management, user authentication and authorization management, user group management, content encryption/decryption key management and distribution, content protection, stream/file transmission, user interaction, and notification or alert for informing urgent advertisement. Herein, the MBS server 100 may receive service contents from the content provider 102. In addition to the above functions, the MBS server 100 may perform functions for providing an optimal broadcast service by synthetically analyzing the conditions of the ACR and broadcast service information (e.g., broadcast schedules) received from at least one service provider. For example, the MBS server 100 may perform other functions such as broadcast zone management, service guide processing/transmission, stream/file transmission, multicast group management, and reception report management. The above-mentioned functions of the MBS server 100 may be performed in one network entity or in a plurality of network entities in a distributed fashion.

In connection with the MBS server 100, the AAA server 106 performs functions such as authentication and accounting for the MS 114. Also, in connection with the MBS server 100, the AAA server 106 helps to generate encryption keys for contents, and triggers the periodical refresh of the encryption keys.

The policy server 104 manages a QoS for each Internet Protocol (IP) flow. When an MBS service is triggered for a specific MS, the policy server 104 transmits triggering information to the ASN through a Diameter, Common Open Policy Service (COPS), or Radius interface.

The system manager 108 transmits information about network configuration to the ASN, and manages the ACR 110 and the RAS 112 of the ASN. Also, for maintenance, the system manager 108 may transmit Operation/Administration/Maintenance (OAM) information (e.g., broadcast start/end management information and time correction parameters) to the ASN. Herein, a COPS, Diameter, or Radius interface may be used between the system manager 108 and the ASN.

Herein, the ASN, the AAA server 106, and the system manager 108 belong to a region of an Access Service Provider (ASP).

The ACR 110 transmits broadcast contents received from the MBS server 100 to the RAS 112. An MBS controller (not illustrated) in the ACR 110 performs data/time synchronization for received broadcast contents, and multicasts the synchronized broadcast packet to RASs in the same MBS zone. Also, the ACR 110 manages the mobility and connection of the MS 114, and generates a service flow (SF) for each of uplink/downlink connections. For example, if an MBS triggering for the MS 114 is reported from the policy server 104, information of the corresponding SF is notified to the MS 114. Herein, the ACR 110 interfaces with the policy server 104 through a COPS, Diameter, or Radius protocol.

The RAS 112 transmits broadcast contents received from the ACR 110 to the MS 114. The RAS 112 is connected to the ACR 110 in a wired fashion and is connected to the MS 114 in a wireless fashion. The ACR 112 allocates resources to the MS 114 by scheduling traffic based on a MAC layer QoS.

Also, the RAS 112 receives time stamping/packetization traffic from the ACR 110 or the MBS server 100, based on the air scheduling information preset with respect to MBS traffic, and bypasses/broadcasts the received traffic at the time-stamped point. For example, the time synchronization and packetization for the MBS traffic may be performed in the content server 100 or the MBS controller of the ACR 110.

Also, according to the present invention, the RAS 112 performs buffer management and Connection Admission Control (CAC) considering the MBS service, which will be described later in detail with reference to the corresponding drawings.

As illustrated in FIG. 1, each of MBS zones includes a plurality of RASs, and the RASs in the same MBS zone transmits the same broadcast contents at the same time by mapping them to the same resources.

Figure 2:
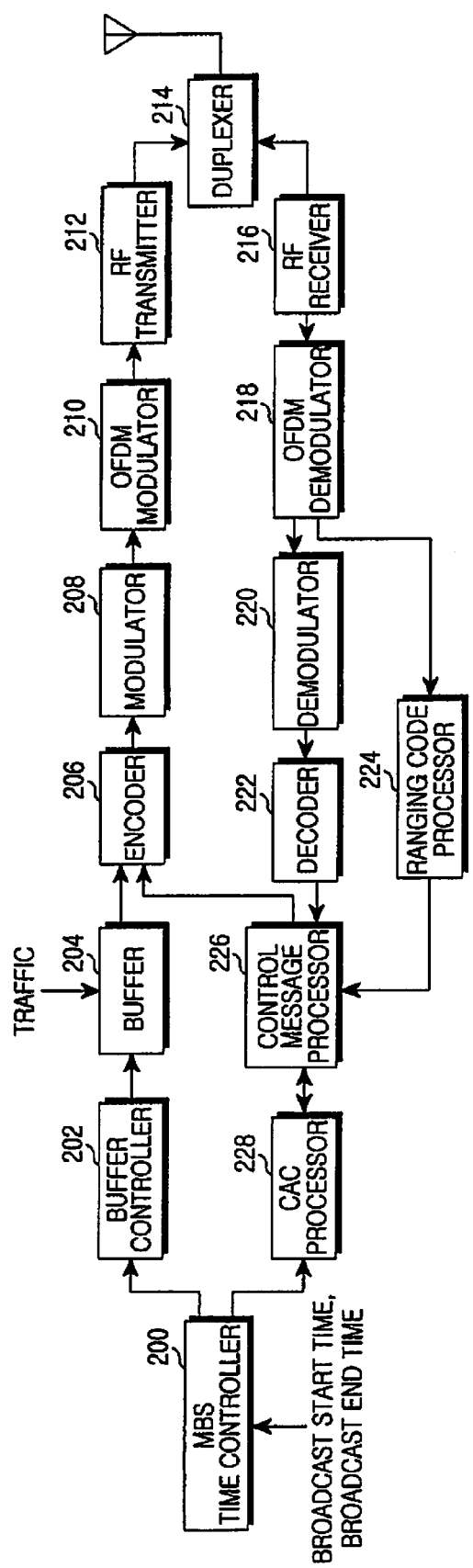
FIG. 2 is a block diagram of a RAS in a BWA system according to an embodiment of the present invention.

FIG. 2 is a block diagram of a RAS in the BWA system according to an embodiment of the present invention.

Referring to FIG. 2, the RAS includes an MBS time controller 200, a buffer controller 202, a buffer 204, an encoder 206, a modulator 208, an OFDM modulator 210, an RF transmitter 212, a duplexer 214, a radio frequency (RF) receiver 216, an OFDM demodulator 218, an MBS time controller 200, a demodulator 220, a decoder 222, a ranging code processor 224, a control message processor 226, and a CAC processor 228.

Based on a duplexing scheme, the duplexer 214 transmits a TX signal received from the RF transmitter 212 through an antenna, and provides an RX signal received from the antenna to the RF receiver 216. For example, in the case of a TDD scheme, the duplexer 214 transmits a signal received from the RF transmitter 212 through an antenna in a TX mode, and provides a signal received through the antenna to the RF receiver 216 in an RX mode.

The buffer 204 buffers TX traffic (e.g., MAC PDUs or bursts) under the control of the buffer controller 202. Herein, it is assumed that the buffer 204 buffers both unicast traffic and MBS traffic.

The encoder 206 encodes packets (unicast service packets or MBS packets) from the buffer 204 in accordance with a predetermined coding scheme. The modulator 208 modulates data from the encoder 206 in a predetermined modulation scheme. The OFDM modulator 210 Inverse Fast Fourier Transform (IFFT)-processes data from the modulator 208 to output sampled data (OFDM symbols). The RF transmitter 212 converts the sampled data from the OFDM modulator 210 into an analog signal, converts the analog signal into an RF signal, and transmits the RF signal through the antenna.

The RF receiver 216 converts an RF signal from the duplexer 214 into a baseband signal. The OFDM demodulator 218 Fast Fourier Transform (FFT)-processes baseband sampled data from the RF receiver 216 to output frequency-domain data. Herein, the OFDM demodulator 218 arranges and outputs the frequency-domain data on a burst basis according to a MCS level.

The demodulator 220 demodulates data from the OFDM demodulator 218 in a predetermined demodulation scheme. The decoder 222 decodes data from the demodulator 220 in a predetermined decoding scheme. The above processes result in physical layer decoding of data. The physical-layer-decoded data is divided into a data packet and a control packet for processing by the control message processor 226.

The control message processor 226 processes an input control message and generates a control message to be transmitted. The generated control message is provided to the encoder 206 and is transmitted through the above-described TX path and the antenna.

The ranging code processor 224 receives data mapped to a predetermined region (e.g., a ranging region) from the OFDM demodulator 218, and demodulates the data into a known Code Division Multiple Access (CDMA) code (e.g., a ranging code) to detect a ranging code. Examples of the detected ranging code include an initial ranging code, a bandwidth request ranging code, a periodic ranging code, and a handover ranging code. According to the present invention, the ranging code processor 224 detects an initial ranging code transmitted from a mobile station to a RAS, and provides the initial ranging code to the control message processor 226.

Upon receipt of the initial ranging code, the control message processor 226 detects connection of a mobile station and inquires of the CAC processor 228 about whether to admit the connection of the mobile station. If the connection of the mobile station is admitted, the control message processor 226 generates a predetermined resource allocation message (e.g., CDMA_Alloc_IE) in response to the initial ranging code. The resource allocation message is processed in format suitable for actual transmission by the physical layer, and the resulting message is transmitted to the mobile station.

Also, upon receipt of a Dynamic Service Addition REQuest (DSA-REQ) message from a mobile station, or upon receipt of a DSA triggering request for service addition to a mobile station from an ACR (or ASN_GW), the control message processor 226 inquires of the CAC processor 228 whether to admit the service addition to the mobile station. If the service addition to the mobile station is admitted, the control message processor 226 generates a response message for the service addition (e.g., a DSA-RSP message or a DSA-REQ message). The generated message is processed in format suitable for actual transmission by the physical layer, and the resulting message is transmitted to the mobile station. In this manner, the service admission control (CAC) may be performed in various situations such as generation of a service addition request or an initial connection of the mobile station.

The CAC processor 228 manages available system resources. Upon receipt of the initial connection request of a mobile station or the service addition request of a mobile station from the control message processor 226, the CAC processor 228 determines whether to admit the request on the basis of the current available resources, and notifies the results to the control message processor 226.

The MBS time controller 200 sets the broadcast start time and the broadcast end time on the basis of information received from the corresponding network entity. The MBS time controller 200 detects the current time and notifies the start of the broadcast to the CAC processor 228 ($T_{dur}+\delta_C$) time before the broadcast start time. Also, the MBS time controller 200 detects the current time and notifies the start of the broadcast to the buffer controller 202 $\delta_B$ time before the broadcast start time. Also, the MBS time controller 200 detects the current time and notifies the end of the broadcast to the buffer controller 202 and the CAC processor 228 if the detected current time equals the broadcast end time. Herein, the current time may be detected using the GPS time information of an Operation/Administration/Maintenance (OAM) block.

Upon receipt of the broadcast start notification from the MBS time controller 200, the CAC processor 228 calculates an MBS-induced capacity decrease $\Delta C_{MBS}$ and updates an available capacity using the MBS-induced capacity decrease $\Delta C_{MBS}$. The CAC processor 228 performs a CAC operation based on the updated available capacity. That is, upon detection of the initial connection of a mobile station, or upon receipt of the service addition request of a mobile station, the CAC processor 228 determines whether to admit the connection on the basis of the updated available capacity. Upon receipt of the broadcast end notification from the MBS time controller 200, the CAC processor 228 releases an MBS-induced capacity decrease $\Delta C_{MBS}$ to update the current available capacity. That is, the CAC processor 228 performs the CAC operation from a predetermined time before the broadcast start time in consideration of the MBS-induced capacity decrease. A detailed operation of the CAC processor 228 will be described later with reference to FIG. 3.

Upon receipt of the broadcast start notification from the MBS time controller 200, the buffer controller 202 detects the traffic load of the buffer 204 and checks whether the available space of the buffer 204 is larger than the buffer size $B_{MBS}$ required by the MBS traffic. If the available space is smaller than or equal to the required buffer size $B_{MBS}$, the occupation of the buffer 204 by the unicast traffic is restricted to prevent the unicast traffic from being enqueued into the buffer 204. Otherwise if the available space is larger than the required buffer size $B_{MBS}$, the occupation of the buffer 204 by the unicast traffic is admitted to provide the buffer space for the MBS traffic from a predetermined time before the broadcast start time.

Figure 3:
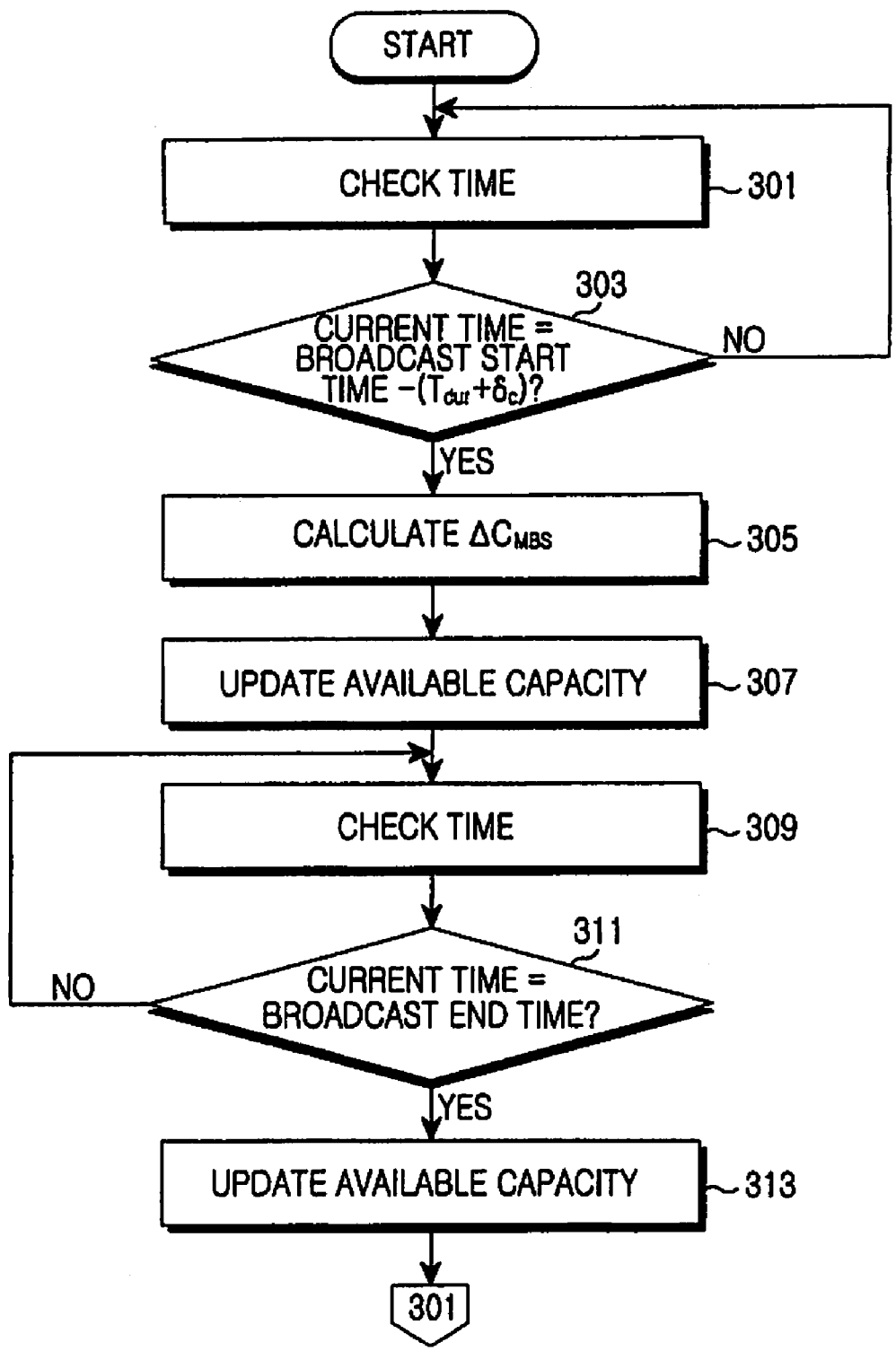
FIG. 3 is a flowchart illustrating an operation of a CAC processor of the RAS in consideration of a broadcast service-induced change in variable capacity in an MBS-providing communication system according an embodiment of the present invention.

FIG. 3 is a flowchart illustrating an operation of the RAS for guaranteeing a QoS in an MBS-providing communication system according an embodiment of the present invention. In particular, FIG. 3 illustrates a QoS guaranteeing method from the viewpoint of the CAC.

Referring to FIG. 3, the RAS (or BS) detects the current time in step 301. Herein, the current time may be detected using the GPS time information of an OAM block. In step 303, the RAS determines whether the current time equals a predetermined time before the broadcast start time (the broadcast start time−($T_{dur}+\delta_C$)). If the current time equals the predetermined time before the broadcast start time, the operation proceeds to step 305. In step 305, the RAS calculates an MBS-induced capacity decrease $\Delta C_{MBS}$ by Equation (1).

In step 307, the RAS subtracts the MBS-induced capacity decrease $\Delta C_{MBS}$ from the current available capacity to update the available capacity. Thereafter, the RAS performs a CAC operation using the updated available capacity. For example, the RAS performs a CAC operation in consideration of the MBS-induced capacity decrease $\Delta C_{MBS}$ before the broadcast start time.

In step 309, the RAS detects the current time. In step 311, the bases station determines whether the current time equals the broadcast end time. If the current time equals the broadcast end time, the operation proceeds to step 313. In step 313, the RAS adds the MBS-induced capacity decrease $\Delta C_{MBS}$ to the current available capacity to update the available capacity. Thereafter, the operation returns to step 301. That is, when the broadcast ends, the MBS-induced capacity decrease $\Delta C_{MBS}$ is released to update the current available capacity again.

Figure 4:
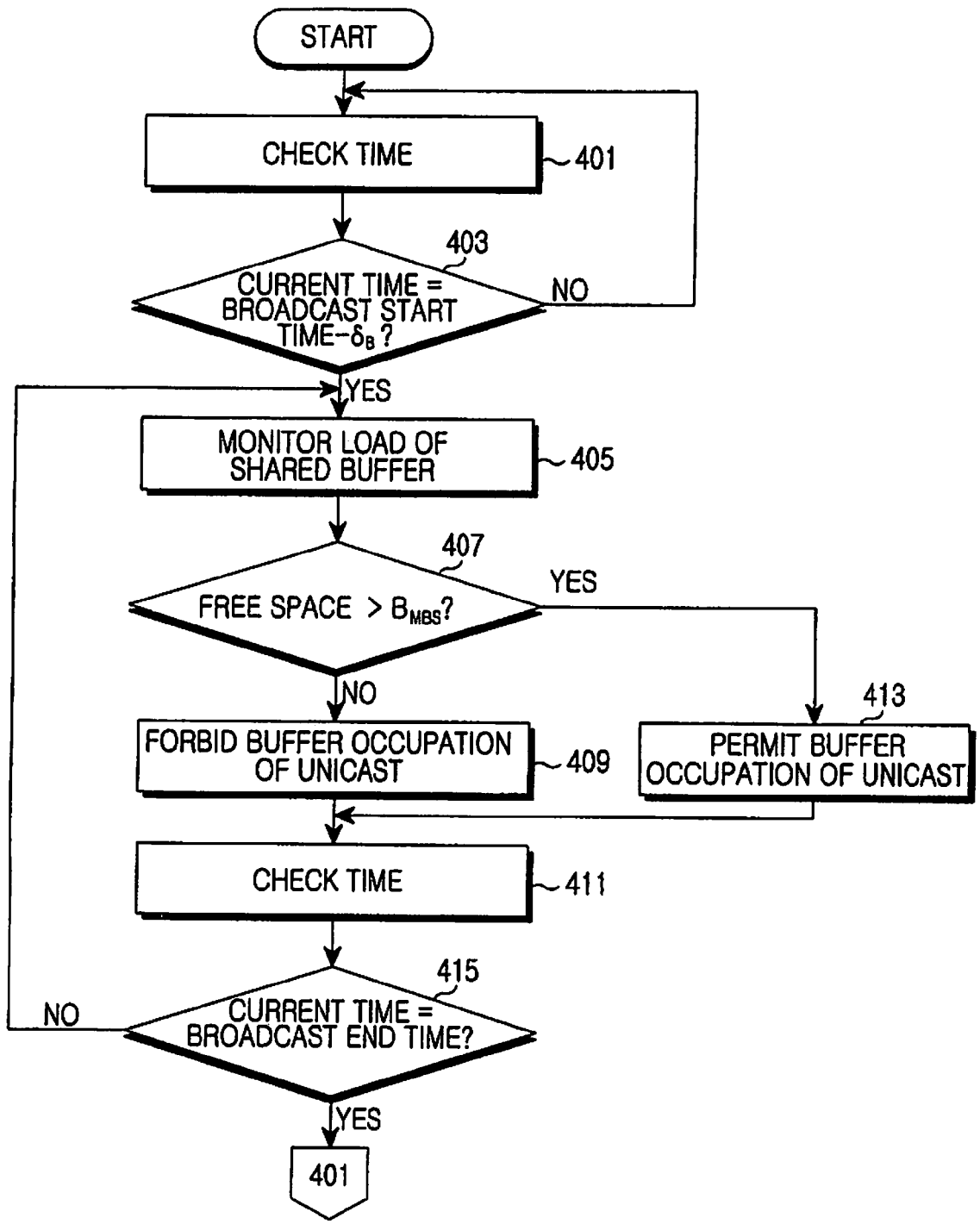
FIG. 4 is a flowchart illustrating an operation of a buffer controller of the RAS for a broadcast service in an MBS-providing communication system according an embodiment of the present invention.

FIG. 4 is a flowchart illustrating an operation of the RAS for guaranteeing a QoS in an MBS-providing communication system according an embodiment of the present invention. In particular, FIG. 4 illustrates a QoS guaranteeing method from the viewpoint of the buffer control.

Referring to FIG. 4, the RAS (or BS) detects the current time in step 401. Herein, the current time may be detected using the GPS time information of an OAM block. In step 403, the RAS determines whether the current time equals a predetermined time before the broadcast start time (the broadcast start time−$\delta_B$).

If the current time equals the predetermined time before the broadcast start time, the operation proceeds to step 405. In step 405, the RAS detects the traffic load of the buffer 204. In step 407, the RAS checks whether the available space of the buffer 204 is larger than the buffer size $B_{MBS}$ required by the MBS traffic.

If the available space is less than or equal to the required buffer size $B_{MBS}$, the operation proceeds to step 409. In step 409, the RAS restricts the occupation of the buffer 204 by the unicast traffic to prevent the unicast traffic from being input into the buffer 204. On the other hand, if the available space is greater than the required buffer size $B_{MBS}$, the operation proceeds to step 413. In step 413, the RAS admits the occupation of the buffer 204 by the unicast traffic.

Thereafter, the RAS detects the current time in step 411. In step 415, the RAS determines whether the current time equals the broadcast end time. If the current time does not equal the broadcast end time, the operation returns to step 405 in order to recheck the available space of the buffer 204. On the other hand, if the current time equals the broadcast end time, the operation returns to step 401.

As described above, the present invention can satisfy both of the QoSs of a unicast service and an MBS service in the system providing the two services. Also, the present invention performs a CAC operation in consideration of an MBS-induced capacity decrease from a predetermined time before the broadcast start time, thereby preventing the QoS of the unicast service from degrading due to the MBS service. Also, the present invention provides the buffer space from a predetermined time before the broadcast start time, thereby preventing the QoS of the unicast service from degrading due to the forcible drop of the traffic of buffer and also preventing the QoS of the MBS service from degrading due to the need to wait until the obtaining the buffer space. That is, the present invention can provide the efficient use of radio resources by performing the CAC and the buffer control in consideration of the MBS service.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An apparatus of a base station in a wireless communication system, the apparatus comprising:
   a time controller for managing a broadcast start time and a broadcast end time and notifying a start of a broadcast service at a predetermined time before the broadcast start time; and
   a Connection Admission Control (CAC) processor for, upon being notified the start of the broadcast service from the time controller, calculating capacity decrease due to broadcast service and subtracting the broadcast service-caused capacity decrease from a current available capacity to update the available capacity,
   wherein the capacity decrease due to broadcast service is proportional to radio resources allocated for the broadcast service, and is inversely proportional to total downlink radio resources.

2. The apparatus of claim 1, wherein the broadcast service is one of a Multicast and Broadcast service (MBS), a Multi-Cast and BroadCast Service (MCBCS), a Multimedia Broadcast and Multicast Service (MBMS), and a BroadCast/MultiCast Service (BCMCS).

3. The apparatus of claim 1, wherein the capacity decrease due to broadcast service is calculated using a ratio of resources allocated for the broadcast service to a total downlink resources.

4. The apparatus of claim 1, wherein the capacity decrease due to broadcast service is calculated by:

$$\Delta C_{MBS} = C_{avg} \times \left(\frac{N_{MBS}}{N_{DN}}\right) \times \alpha_C$$

where $C_{avg}$ denotes an average radio channel capacity not considering the broadcast service, $N_{MBS}$ denotes radio resources allocated for the broadcast service, $N_{DN}$ denotes the total downlink radio resources, and $\alpha_C$ (>1) denotes a scaling factor.

5. The apparatus of claim 1, wherein the predetermined time is calculated by:

Predetermined time=$T_{dur}+K\times\sigma_{dur}$ where $T_{dur}$ denotes a mean duration of a unicast connection, $\sigma_{dur}$ denotes a standard deviation of the duration, and K denotes a factor for adjusting a probability of a unicast connection ending before the broadcast start time.

6. The apparatus of claim 1, wherein upon receipt of a service addition request for a mobile station, the CAC processor determines whether to admit the service addition request based on the available capacity.

7. The apparatus of claim 1, wherein upon receipt of a broadcast end notification from the time controller, the CAC processor calculates the available capacity by adding the capacity decrease due to broadcast service to the current available capacity.

8. An apparatus of a base station in a wireless communication system, the apparatus comprising:
   a time controller for managing a broadcast start time and a broadcast end time and notifying a start of a broadcast service at a predetermined time before the broadcast start time; and
   a buffer controller for, upon being notified the start of the broadcast service from the time controller, restricting a buffer occupation of unicast traffic when available space of the buffer is less than a buffer size required by a broadcast service,
   wherein the predetermined time is proportional to the buffer size required by the broadcast service, and is inversely proportional to a traffic output rate from the buffer.

9. The apparatus of claim 8, wherein the broadcast service is one of a Multicast and Broadcast Service (MBS), a Multi-Cast and BroadCast Service (MCBCS), a Multimedia Broadcast and Multicast Service (MBMS), and a BroadCast/MultiCast Service (BCMCS).

10. The apparatus of claim 8, wherein upon receipt of a broadcast end notification from the time controller, the buffer controller ends the control of the buffer occupation of the unicast traffic.

11. The apparatus of claim 8, wherein the predetermined time is calculated by:

$$\delta_B = \frac{B_{MBS}}{C_{avg}} \times \alpha_B$$

where $B_{MBS}$ denotes a buffer size required by the broadcast service, $C_{avg}$ denotes a traffic output rate from the buffer, and $\alpha_B$ (>1) denotes a scaling factor.

12. A method for operating a base station in a wireless communication system, the method comprising:
   determining, by a base station time controller, whether a current time is a predetermined time before a broadcast start time;
   determining, by a base station Connection Admission Control (CAC) processor, a capacity decrease due to broadcast service if the current time is the predetermined time before the broadcast start time; and
   updating, by the base station, an available capacity used for CAC using the calculated capacity decrease,
   wherein the capacity decrease due to broadcast service is proportional to radio resources allocated for the broadcast service, and is inversely proportional to total downlink radio resources.

13. The method of claim 12, wherein the broadcast service is one of a Multicast and Broadcast service (MBS), a Multi-Cast and BroadCast Service (MCBCS), a Multimedia Broadcast and Multicast Service (MBMS), and a BroadCast/MultiCast Service (BCMCS).

14. The method of claim 12, wherein the capacity decrease due to broadcast service is calculated using a ratio of resources allocated for the broadcast service to a total downlink resources.

15. The method of claim 12, wherein the capacity decrease due to broadcast service is calculated by:

$$\Delta C_{MBS} = C_{avg} \times \left(\frac{N_{MBS}}{N_{DN}}\right) \times \alpha_C$$

where $C_{avg}$ denotes an average radio channel capacity not considering the broadcast service, $N_{MBS}$ denotes radio resources allocated for the broadcast service, $N_{DN}$ denotes the total downlink radio resources, and $\alpha_C$ (>1) denotes a scaling factor.

16. The method of claim 12, wherein the predetermined time is calculated by:

Predetermined time=$T_{dur}+K\times\sigma_{dur}$ where $T_{dur}$ denotes a mean duration of a unicast connection, $\sigma_{dur}$ denotes a standard deviation of the duration, and K denotes a factor for adjusting a probability of a unicast connection ending before the broadcast start time.

17. The method of claim 12, further comprising:
upon receipt of a service addition request from a mobile station, determining, by the base station, whether to admit the service addition request based on the available capacity.

18. The method of claim 12, further comprising:
if the current time reaches a broadcast end time, calculating, by the base station, the available capacity by adding the capacity decrease due to broadcast service to the current available capacity.

19. A method for operating a base station in a broadband wireless access communication system, the method comprising:
determining whether a current time is a predetermined time before a broadcast start time;
if the current time is the predetermined time before the broadcast start time, comparing available space of a buffer with a buffer size required by the broadcast service; and
restricting a buffer occupation of unicast traffic when available space of the buffer is less than the buffer size required by the broadcast service,
wherein the predetermined time is proportional to the buffer size required by the broadcast service and is inversely proportional to a traffic output rate from the buffer.

20. The method of claim 19, wherein the broadcast service is one of a Multicast and Broadcast service (MBS), a Multi-Cast and BroadCast Service (MCBCS), a Multimedia Broadcast and Multicast Service (MBMS), and a BroadCast/MultiCast Service (BCMCS).

21. The method of claim 19, further comprising ending the restriction of buffer occupation of the unicast traffic when the current time reaches a broadcast end time.

22. The method of claim 19, wherein the predetermined time is calculated by:

$$\delta_B = \frac{B_{MBS}}{C_{avg}} \times \alpha_B$$

where $B_{MBS}$ denotes a buffer size required by the broadcast service, $C_{avg}$ denotes a traffic output rate from the buffer, and $\alpha_B$ (>1) denotes a scaling factor.

23. An apparatus of a base station in a wireless communication system, the apparatus comprising:
a timing controller for managing a broadcast start time and a broadcast end time, notifying a start of a broadcast service to a Connection Admission Control (CAC) processor at a first predetermined time before the broadcast start time, and notifying the start of the broadcast service to a buffer controller at a second predetermined time before the broadcast start time;
the CAC processor for, upon being notified the start of the broadcast service from the time controller, calculating a capacity decrease due to broadcast service and subtracting the capacity decrease from a current available capacity to update the available capacity; and
the buffer controller for, upon being notified of the start of the broadcast service from the time controller, restricting a buffer occupation of unicast traffic when available space of the buffer is less than a buffer size required by the broadcast service,
wherein the capacity decrease due to broadcast service is proportional to radio resources allocated for the broadcast service, and is inversely proportional to total downlink radio resources.

24. The apparatus of claim 23, wherein the capacity decrease due to broadcast service is calculated using a ratio of resources allocated for the broadcast service to a total downlink resources.

25. The apparatus of claim 23, wherein the second predetermined time is determined using the buffer size required by the broadcast service and a traffic output rate from the buffer.

26. A method for operating a base station in a wireless communication system, the method comprising:
determining whether a current time is a first/second predetermined time before a broadcast start time;
determining a capacity decrease due to broadcast service if the current time is the first predetermined time before the broadcast start time; and
if the current time is the second predetermined time before the broadcast start time, restricting a buffer occupation of unicast traffic when available space of the buffer is less than a buffer size required by a broadcast service,
wherein the second predetermined time is determined using the buffer size required by the broadcast service and a traffic output rate from the buffer.

27. The method of claim 26, wherein the capacity decrease due to broadcast service is calculated using a ratio of resources allocated for the broadcast service to a total downlink resources.

28. The apparatus of claim 1, wherein the predetermined time is determined using a statistical probability distribution of duration of a unicast connection.

29. The apparatus of claim 8, wherein the predetermined time is determined using the buffer size required by the broadcast service and a traffic output rate from the buffer.

30. The method of claim 12, wherein the predetermined time is determined using a statistical probability distribution of duration of a unicast connection.

31. The method of claim 19, wherein the predetermined time is determined using the buffer size required by the broadcast service and a traffic output rate from the buffer.

32. The apparatus of claim 23, wherein the first predetermined time is determined using a statistical probability distribution of duration of a unicast connection.

33. The method of claim 26, wherein the first predetermined time is determined using a statistical probability distribution of a duration of a unicast connection.

* * * * *